US012631041B2

(12) United States Patent
Salvatore et al.

(10) Patent No.: US 12,631,041 B2
(45) Date of Patent: May 19, 2026

(54) MULTIDIRECTIONAL HYSTERETIC DAMPER ENDOWED WITH NEGATIVE STIFFNESS

(71) Applicant: UNIVERSITA' DEGLI STUDI DI ROMA "LA SAPIENZA", Rome (IT)

(72) Inventors: Andrea Salvatore, Rome (IT); Biagio Carboni, Rome (IT); Walter Lacarbonara, Rome (IT)

(73) Assignee: UNIVERSITA' DEGLI STUDI DI ROMA "LA SAPIENZA", Rome (IT)

( * ) Notice: Subject to any disclaimer, the term of this patent is extended or adjusted under 35 U.S.C. 154(b) by 236 days.

(21) Appl. No.: 18/697,157

(22) PCT Filed: Sep. 30, 2022

(86) PCT No.: PCT/IB2022/059325
§ 371 (c)(1),
(2) Date: Mar. 29, 2024

(87) PCT Pub. No.: WO2023/053074
PCT Pub. Date: Apr. 6, 2023

(65) Prior Publication Data
US 2024/0401361 A1     Dec. 5, 2024

(30) Foreign Application Priority Data
Sep. 30, 2021     (IT) ........................ 102021000025130

(51) Int. Cl.
*E04H 9/02*          (2006.01)
*F16F 15/02*         (2006.01)
(Continued)

(52) U.S. Cl.
CPC ............. *E04H 9/021* (2013.01); *E04H 9/023* (2013.01); *E04H 9/0237* (2020.05);
(Continued)

(58) Field of Classification Search
CPC ....... E04H 9/021; E04H 9/023; E04H 9/0237; F16F 15/04; F16F 2224/0241;
(Continued)

(56) References Cited

U.S. PATENT DOCUMENTS

| | | | | |
|---|---|---|---|---|
| 1,761,322 A | * | 6/1930 | Wells | ...................... E04H 9/021 |
| | | | | 52/167.2 |
| 4,511,115 A | | 4/1985 | Ludwigsen | |

(Continued)

FOREIGN PATENT DOCUMENTS

| | | | |
|---|---|---|---|
| CN | 101351601 B | 3/2012 | |
| CN | 106400975 A | * 2/2017 | ............... E04B 1/36 |

(Continued)

OTHER PUBLICATIONS

International Search Report for International Patent Application No. PCT/IB2022/059325, mailed Jan. 17, 2023.

(Continued)

*Primary Examiner* — Brent W Herring
(74) *Attorney, Agent, or Firm* — CANTOR COLBURN LLP

(57) ABSTRACT

Provided is a mechanical device to be connected in series or in parallel to a structure to be protected from dynamic stresses so as to vary mechanical features of the system and control the general dynamic behavior. The mechanical device is a multi-purpose rheological element employable in various applications including vibration isolation, vibration absorption, shock absorption, energy dissipation, and other applications based on rheological force-movement behavior.

16 Claims, 10 Drawing Sheets

(a)          (b)          (c)

(51) Int. Cl.
  *F16F 15/04* (2006.01)
  *F16F 15/08* (2006.01)
(52) U.S. Cl.
  CPC ............ *F16F 15/021* (2013.01); *F16F 15/04* (2013.01); *F16F 15/08* (2013.01); *F16F 2224/0241* (2013.01); *F16F 2224/0258* (2013.01); *F16F 2228/063* (2013.01); *F16F 2228/08* (2013.01)
(58) Field of Classification Search
  CPC ........... F16F 2224/0258; F16F 2228/08; F16F 2228/001; F16F 15/021; F16F 15/08; F16F 2228/063; B60R 19/34
  USPC ....................... 52/167.1, 167.4, 167.6, 167.8
  See application file for complete search history.

(56) References Cited

U.S. PATENT DOCUMENTS

| | | | |
|---|---|---|---|
| 5,310,157 A | | 5/1994 | Platus |
| 5,452,549 A | * | 9/1995 | Medeot ................... E04H 9/021 |
| | | | 52/167.4 |
| 5,549,270 A | * | 8/1996 | Platus ..................... F16F 15/06 |
| | | | 248/619 |
| 5,689,919 A | * | 11/1997 | Yano ....................... E04H 9/023 |
| | | | 52/167.6 |
| 6,226,935 B1 | * | 5/2001 | Kuramochi ........... E04H 9/0237 |
| | | | 52/167.3 |
| 8,857,110 B2 | | 10/2014 | Constantinou et al. |
| 9,370,982 B2 | | 6/2016 | Suissa |
| 2006/0174555 A1 | * | 8/2006 | Zayas .................... E04H 9/021 |
| | | | 52/167.4 |
| 2012/0174500 A1 | * | 7/2012 | Yakoub .................... E04B 1/98 |
| | | | 52/167.6 |
| 2017/0108034 A1 | * | 4/2017 | McGuire ............. F16C 11/0604 |
| 2017/0211655 A1 | * | 7/2017 | Chaen ..................... F16F 15/04 |
| 2020/0318373 A1 | * | 10/2020 | Almazán Campillay ................... F16F 1/3732 |
| 2022/0081925 A1 | * | 3/2022 | Noori ...................... E04H 9/021 |
| 2022/0282766 A1 | * | 9/2022 | Pu ........................ F16F 15/073 |

FOREIGN PATENT DOCUMENTS

| | | | | |
|---|---|---|---|---|
| CN | 106545101 A | * | 3/2017 | ............ E04H 9/021 |
| CN | 106836543 A | | 6/2017 | |
| CN | 208685843 U | * | 4/2019 | |
| CN | 110397175 A | | 11/2019 | |
| CN | 111119366 A | | 5/2020 | |
| EP | 0098657 A1 | * | 1/1984 | ............ B62D 37/04 |
| JP | 6304933 B2 | | 4/2018 | |

OTHER PUBLICATIONS

Salvatore, A. et al., Nonlinear Dynamic Response of an Isolation System With Negative Stiffness and Shape Memory-Based Damping, 2020 IDETC-CIE, vol. 2: 16th International Conference on Multibody Systems, Nonlinear Dynamics, and Control (MSNDC), ASME, DOI: 10.1115/DETC2020-22541.

Salvatore, A. et al., Nonlinear dynamic response of a Negative Stiffness-Shape Memory Alloy isolation system, 2021, Nonlinear Dynamics, DOI: 10.21203/rs.3.rs-186071/v1.

Salvatore, A., Lacarbonara, W., On the shock performance of a tri-stable isolator, Feb. 16-19, 2021, Nodycon.

Charalampakis A.E., Tsiatas G.C., A Simple Rate-Independent Uniaxial Shape Memory Alloy (SMA) Model, Aug. 28, 2018, Frontiers in Built Environment, vol. 4, Article 46.

* cited by examiner (a)                                                (b)

MULTIDIRECTIONAL HYSTERETIC DAMPER ENDOWED WITH NEGATIVE STIFFNESS

CROSS-REFERENCE TO RELATED APPLICATIONS

This application is a National Phase Application of PCT International Application PCT/IB2022/059325, having an International Filing Date of Sep. 30, 2022 which claims priority to Italian Application No. 102021000025130 filed Sep. 30, 2021, each of which is hereby incorporated by reference in its entirety.

BACKGROUND ART

References [1]-[8] describe dampers with negative stiffness consisting of flat mechanisms capable of exerting a control force only in a specific direction. In most of the vibration control applications, the direction of stress can be arbitrary in the horizontal plane, and thus the prior art cannot adapt well to actual situations.

References [9]-[11] study non-linear mechanical behaviors characterized by negative stiffness as well as hysteresis, the dynamic response of which is effective in controlling structural vibrations. However, the suggested solutions have substantial limitations related to the one-way nature of the damping capacity and limited non-linear tunability. In fact, the stressing agents, such as earthquakes or wind, are multidirectional due to the stochastic nature thereof.

Reference [15] relates to a multifunctional adaptive friction isolator. The isolator comprises an upper plate, a lower plate, in which the upper plate and the lower plate are provided with sliding surfaces. A sleeve-type slider and/or a shape memory alloy cable clamp is arranged between the two sliding surfaces, and the slider is slidable on the two sliding surfaces. The sleeve stop and the shape memory alloy cable clamp are arranged to limit the movement of the slider and thus of the upper plate, and dissipate the seismic energy, so that the isolator does not generate excessive displacements even under the action of strong earthquakes and is protected.

This solution suggests elements in traction friction forces, thus determining a positive stiffness. The solution is not efficient enough especially for small stresses, as the relative sliding and energy dissipation only occur after having exceeded the friction threshold. Furthermore, the solution is not multidirectional and is not even versatile, as it cannot be easily adjusted.

Reference [16] relates to a vertical isolation device comprising a spring with traction wires therein, as well as an elastomeric element in series with the spring, with the following operating principle: when the dynamic load is vertical, the pressure is transmitted through the elastomeric element to a transmission plate so as to compress the cylindrical spring downwards; when the vertical dynamic load has an opposite direction, the traction force is transmitted to the guide plate by means of a metallic traction rope, the guide plate moves upwards and the force of the metallic traction rope is reversed by a reversing element so as to pull the guide plate to compress the spring again. Therefore, the axial dynamic load always compresses the spring, so that the energy is always dissipated from the spring. Only the part of the elastomeric element, in series with the spring, can dampen horizontal oscillations.

This solution mainly takes into account vertical stresses, has no negative stiffness and is not easily adjustable. Furthermore, the solution does not completely isolate the structure to be isolated, but transmits a part of the vibrations thereto due to the reaction of the elastomeric material. A need remains for a multidirectional hysteretic damper with negative stiffness which is capable of responding to stresses along any direction of the horizontal plane and is adaptable to the various damping applications of structures subjected to actual dynamic actions, providing high performance against low construction and installation costs.

Purpose and Object of the Invention

It is the object of the present invention to provide a multidirectional hysteretic damper with negative stiffness which completely or partially solves the problems and overcomes the drawbacks of the prior art.

A subject-matter of the present invention is a multidirectional hysteretic damper with negative stiffness according to the appended claims.

LIST OF DRAWINGS

The invention will now be described by way of non-limiting example, with particular reference to the drawings of the accompanying figures, in which:

FIG. 1 shows: (a) three-dimensional view in the non-deformed (resting) configuration, (b) three-dimensional cut-away in the deformed configuration and (c) diagrammatic cross-section of the device, according to an embodiment of the device according to the invention;

FIG. 2 shows: (a) force-movement cycles of the damper in different configurations C1, C2 and C3 (there are two continuous curves because it is a hysteresis cycle); (b) overall force-movement cycles obtained by associating the damper to a structure to be controlled (US) in parallel, and (c) equivalent damping curves vs. movement for the uncontrolled structure (US) and for the structure controlled by the three configurations according to the invention;

DETAILED DESCRIPTION

It is worth noting herein that elements of different embodiments can be combined together to provide further embodiments without restrictions by respecting the technical concept of the invention, as those skilled in the art will effortlessly understand from the description.

The present description also relates to the prior art for the implementation thereof, regarding the detail features not described, such as elements of minor importance usually used in the prior art in solutions of the same type, for example.

When an element is introduced, it is always understood that there may be "at least one" or "one or more".

When elements or features are listed in this description, it is understood that the finding according to the invention "comprises" or alternatively "consists of" such elements.

EMBODIMENTS

Embodiments of the invention are described below. Two or more of the parts (elements, devices, systems) described above can be freely associated and considered as part kits according to the invention.

General Description

Figure 1:
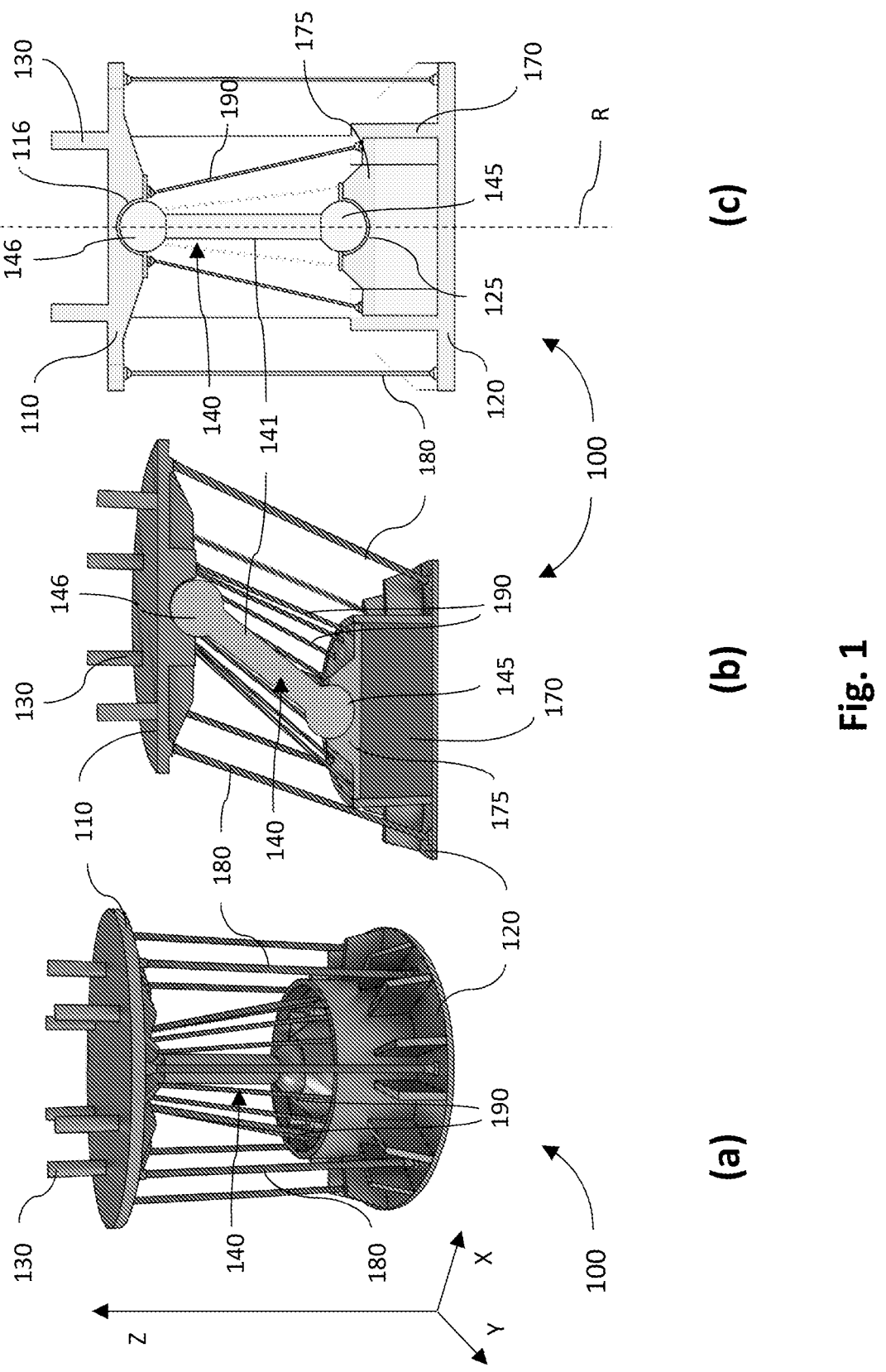

FIG. 1 shows a three-dimensional view of the prototype, a three-dimensional cutaway in the deformed configuration and a diagrammatic cross-section to support the description thereof. The device consists of two steel caps, an upper one 110 and a lower one 120, which are respectively arranged to connect the device to a third structure and to the ground (not shown). The connection with the third structure takes the form of a male (device)-female (structure) connection obtained by means of vertical bars 130 which can slide inside Teflon bushings (or other type of linear bearings) so as to allow a mutual exchange of forces only in the horizontal plane.

The two ends 110 and 120 of the device are connected to each other by means of a vertical connecting rod 140 with a main body 141 and spherical hinges (or "heads") 145 and 146 with low friction at the ends of the main body 141. The spherical heads are rotatable in corresponding, suitable housings 125 and 116 in the body of or rigidly connected to the respective facing bases 120, 110. In the case of the lower base 120, the housing 125 is located above a spring 170. The spring comprises a first and a second opposite end fixed to said first base and to a vertically movable wall 175, respectively (advantageously there are vertical linear bearings along which it runs), in which said first housing 125 is formed. The spring 170 is made of polyurethane, for example.

The spring 170 can also be arranged at the opposite end of the connecting rod 140, i.e., connected between the base 110 and the housing 116. In practice, there can be a movable wall which is geometrically and functionally similar to the wall 175 but at the opposite end of the connecting rod.

The assembly described is pre-compressed by means of a group of pre-tensioned ropes 180 arranged outside the vertical connecting rod 140 (only optionally in an axial-symmetrical circumferential manner or with any other geometric distribution). The pre-tensioned ropes can be made of fiber-reinforced polymers to ensure high deformability and strength. Lastly, the end 110 is connected with the connecting rod-spring plate by a group of wires 190 arranged about the connecting rod, optionally in circumferential and axial-symmetrical configuration, inside the claimed ropes 180 and preferably made of steel or shape memory alloy. The wires 190 are optional and preferably arranged obliquely, i.e., with an opening angle towards the lower end 120. "Ropes" is intended as both rigid bars and ropes of various kinds, optionally tensioned.

The initial pre-compression of the device by pre-tensioning the external ropes 180 is transmitted by means of the vertical connecting rod 140 to the spring 170 which is subject to a compression deformation. The connecting rod 140 is in an unstable equilibrium configuration in the initial position. When the device is stressed in any direction in the horizontal plane (plane perpendicular to the extension direction of the connecting rod 140 in the resting position, indicated by the arrow Z in the figure), it exerts, for a certain adjustable range of displacements, a force in the same movement direction (i.e., negative stiffness). In the presence of a relative movement between the two ends of the device in the horizontal direction (in the X-Y plane), the connecting rod 140 rigidly rotates about the lower hinge 145, sweeping, by virtue of a shorter length with respect to the claimed ropes 180, a greater angle with respect to the latter. This angle difference described by the ropes 180 and the connecting rod 140 causes the horizontal component of the contrasting force exerted by the connecting rod 140 on the upper cap 110 to be greater than the horizontal component of the traction force exerted by the ropes 180, thereby producing a resultant force oriented in the movement direction which determines the negative stiffness. As the relative movement between the ends 110 and 120 of the device increases, the pulling of the ropes 180 and thus the level of pre-compression of the connecting rod decreases up to a limit movement reached which achieves the decompression of the device. This progressive decompression produces a cubic stiffness term in the rheological response of the device. The polyurethane spring (or other elastic means in general) 170 at the base of the connecting rod is also pre-compressed and, during the act of rigid movement of the connecting rod 140, expands, thus causing an upward translation of the lower hinge 145 of the connecting rod. Such vertical translation results in a greater angle swept by the connecting rod 140 and thus in the useful amplification of the negative stiffness and in a delay in the decompression of the device, i.e., in greater ultimate displacements.

The advantages obtained by introducing a negative stiffness contribution in the total restoring force of the system consist in the possibility of obtaining a strong reduction of the stiffness and thus of the accelerations and forces entering the system, together with the achievement of a drastic amplification of the equivalent damping with the same dissipating organ 190 (if present).

The (optional) insertion of the group of oblique wires 190 allows giving again stability to the initial equilibrium position, delaying the entry into play of the negative stiffness and, at the same time, introducing high levels of hysteretic damping without performance losses due to the increase in stiffness provided by the introduction of the wires, since such an increase is cancelled out by the appropriately-calibrated negative stiffness.

For example, assuming an elastic stiffness of the wires 190 equal to the negative one, for displacement levels lower than the displacement corresponding to the yielding (steel wires) or phase transformation (shape memory alloy wires) of the wires 190, a zero force exerted by the device and thus the total restoring force of the system would coincide with that of the structure. However, for greater displacements the negative stiffness is no longer balanced by the elastic stiffness of the wires 190, thus resulting in a reduction in the total force and overall stiffness (accelerations). For wide displacements, close to the maximum permissible displacement, the cubic stiffness term produced by the geometric non-linearities tends to cancel out the negative one, and the total response will again tend to the original one of the system.

Therefore, the insertion of the wires 190 aims, inter alia, to give an appropriate stiffness (high static stiffness) for small displacements, required to counteract almost static actions such as that of wind, and a strongly lower stiffness (by virtue of the negative stiffness (low dynamic stiffness)) for wider displacementss. For even wider displacements, there is the advantage of a substantial increase in positive application of the device. In the C1 configuration, the negative stiffness produced by the connecting rod is not balanced by the elastic stiffness of the wires, therefore the overall response is zero with zero stiffness (it goes to zero in the cycles following the first load, see FIG. 2 (b)) and subsequent increase in stiffness. Such a configuration thus allows cutting the forces entering the system for small and large excitation levels (Low Static, LOW Dynamic stiffness) and also to slow down the structure near the last movement by calibrating the cubic stiffness term (High End Run stiffness). With the C2 and C3 configurations it is possible to obtain a further modulation of the overall stiffness by virtue of the initial elastic stiffness of the wires. In fact, the overall stiffness can thereby be modulated so as to obtain small displacements for small stress levels and small forces for large stress levels (High Static, Low Dynamic stiffness). Furthermore, the group of wires forms a further source of hysteretic damping. The C3 configuration differs from the C2 for the use of NiTiNOL wires rather than steel wires, which allows for a type of self-centering overall response (Self-Recentering capacity) y virtue of the superelastic hysteresis produced by the transformation of the austenitic-martensitic phase and vice versa of the wires. The table summarizes the performance requirements achievable with the three configurations together with potential vibration applications in the field of mechanical mitigation.

| CONFIGURATION | REQUIREMENTS | APPLICATIONS |
|---|---|---|
| C1: wireless | LSs, LDs, HERs | NO CONSTRAINT FOR SMALL STRESSES: Isolation of telescopes, hospital machinery and equipment; vibration absorption of deformable structures. |
| C2: steel wires | HSs, LDs, HERs | CONSTRAINT FOR SMALL STRESSES: Energy dissipation; Seismic isolation of buildings for different uses. |
| C3: NiTiNOL wires | HSs, LDs, HERs, SRc | CONSTRAINT FOR SMALL STRESSES: Energy dissipation; Seismic isolation with re-centering capacity of buildings, in particular, of strategic buildings. | stiffness required to limit the displacementss (below a certain threshold depending on the specific device and structure).

Configurations and Applications

Depending on the presence or absence of the group of oblique wires 190, which are optional, and the material forming such wires, 3 different preferred configurations of the device according to the invention can be identified:

C1) wireless configuration;

C2) configuration with steel wires;

C3) configuration with shape memory alloy wires, i.e., based on Nickel and Titanium (NiTiNOL), with superelastic behavior.

Figure 2:
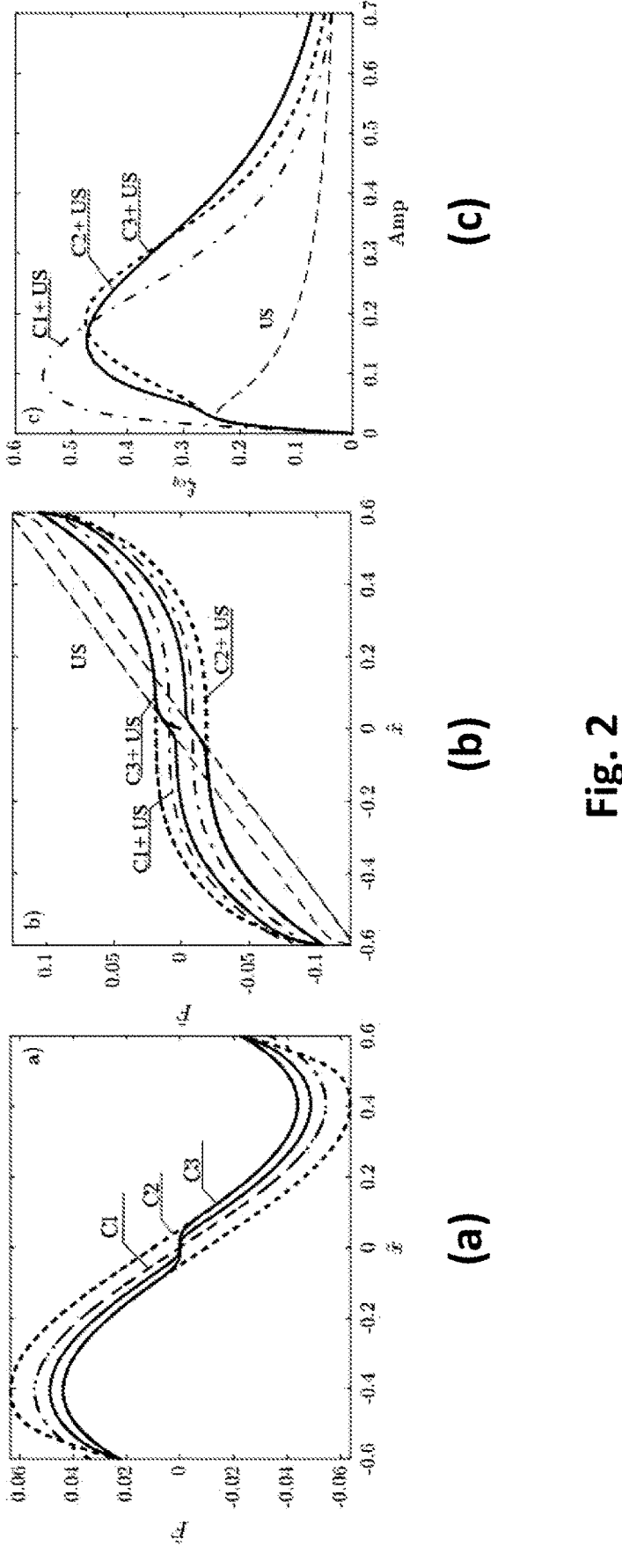

In FIG. 2 it is possible to note the (theoretical) force-movement response of the damper (a), of the system consisting of structure plus damper (b) and the overall equivalent damping curves as a function of the movement (c). Overall equivalent damping ($\xi$) is intended as the ratio of the energy dissipated in a load-unload cycle to the maximum stored elastic energy multiplied by the constant $4\pi$. It can be seen how all three configurations produce a strong reduction in stiffness in the overall response and thus in incoming accelerations and a significant increase in equivalent damping. Furthermore, the stiffening effect for wide displacementss produced by the cubic stiffness term is noted.

The use of different configurations allows achieving different performance requirements depending on the scope of In the Table, "LSs" stands for Low Static stiffness, "LDs" for Low Dynamic stiffness, "HERs" for High End Run stiffness, "SRc" for Self-Recentering capacity.

Figure 3:
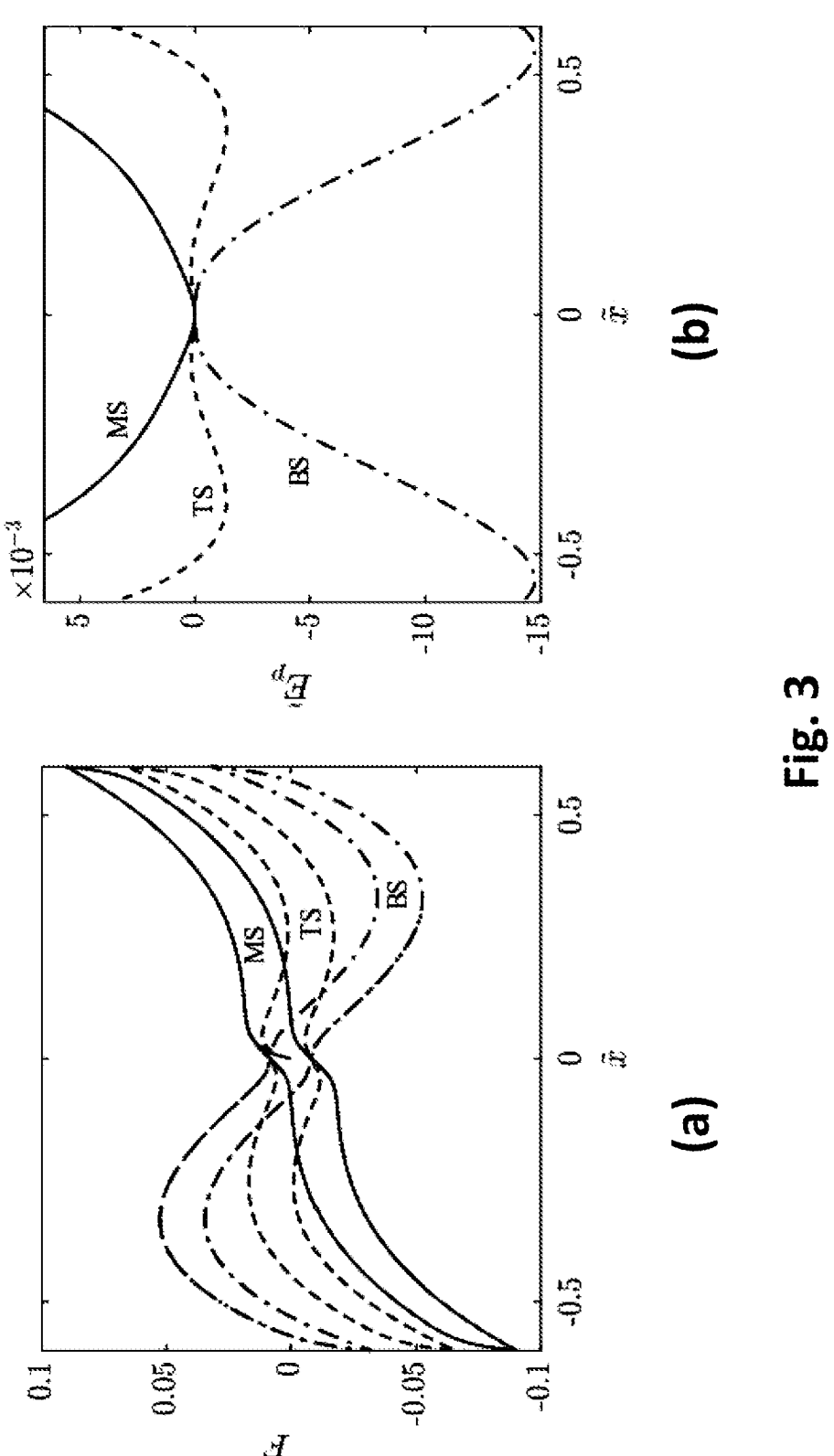
FIG. 3 shows for the C3 configuration in FIG. 2: (a) overall force-movement cycles and (b) potential energy profiles for a mono-stable (MS), tri-stable (TS) and bi-stable (BS) configuration.

In particular, the C3 configuration allows obtaining, depending on the pre-tensioning level of the external ropes and thus of the negative stiffness, three different types of overall response (see FIG. 3). For negative stiffness values less than or equal to the stiffness of the structure to be controlled, a recentering mono-stable response type is obtained (MS in FIG. 3(b)). For higher negative stiffness values, the response becomes tri-stable and then bi-stable. While the first response type is very promising in the field of vibration isolation of buildings, the last two response types find potential application in the field of shock absorption and the development of actuators of any scale and type.

By imposing the balance of forces in the deformed configuration of the device according to the invention (see FIG. 4 b), analytical equations were obtained governing the force-movement response as a function of the geometric and mechanical parameters of the different parts forming the damper. The analytical equation describing the force-movement law in the horizontal plane of the suggested device can be expressed as a function of the geometric and mechanical parameters thereof and the tilting angle $\alpha$ of the connecting rod 140 as:

$$F_x = k_s \frac{\left(\sqrt{(l_b\cos(\alpha) + d_0 + h_m)^2 + (l_b\sin(\alpha))^2} - l_{s0}\right)(l_b\sin(\alpha))}{\sqrt{(l_b\cos(\alpha) + d_s + h_m)^2 + (l_b\sin(\alpha))^2}} -$$
$$k_m(h_{m0} - h_m)\frac{(\sin(\alpha) + \mu\cos(\alpha))}{\mu\sin(\alpha) + \cos(\alpha)} + F_{xDW}$$

where:

$\alpha$ is the inclination with respect to the axis R running perpendicular between the bases 120 and 110 of the device at rest (i.e., perpendicular to a horizontal plane to which the two bases extend parallel, see FIG. 1)

$k_s$ is the sum of the axial stiffnesses of the external pre-compression ropes 180;

$k_m$ is the axial stiffness of the spring 170;

$\mu$ is the friction coefficient t between the sliding surfaces of the two spherical hinges 145 and 146;

$l_b$ is the length of the rigid connecting rod 140;

$d_s$ is the vertical distance measured from the center of the lower spherical hinge (head) 145 to the upper face of the spring 170;

$l_{s0}$ is the length of the external pre-compression ropes 180 in an undeformed condition;

$h_{m0}$ is the height of the spring 170 in an undeformed condition;

$h_m$ is the height of the spring 170 in operation;

$F_{xDW}$ is the force exerted on the horizontal plane by the group of oblique wires 190.

The height of the spring in operation $h_m$ can be expressed as a function of the angle $\alpha$ using the positive solution of the following fourth-order polynomial:

$$a_p h_m^4 + b_p h_m^3 + c_p h_m^2 + d_p h_m + e_p = 0$$

with coefficients:

$$F_{xDWi} =$$
$$\sigma_i(\epsilon_i, \dot{\epsilon}_i)A_{dw} \frac{\left(\dfrac{l_b\cos(\alpha) + r\cos(\delta_{0i}) - \sqrt{l_b\cos(\alpha) + d_{dw}}}{|\sin(\alpha) - \mu\cos(\alpha)|}{\cos(\alpha) + \mu\sin(\alpha)}\right)}{\sqrt{(l_b\cos(\alpha) + d_{dw})^2 + (l_b\cos(\alpha) + r\cos(\delta_{0i}))^2 + (r\sin(\delta_{0i}))^2}}$$

Figure 4:
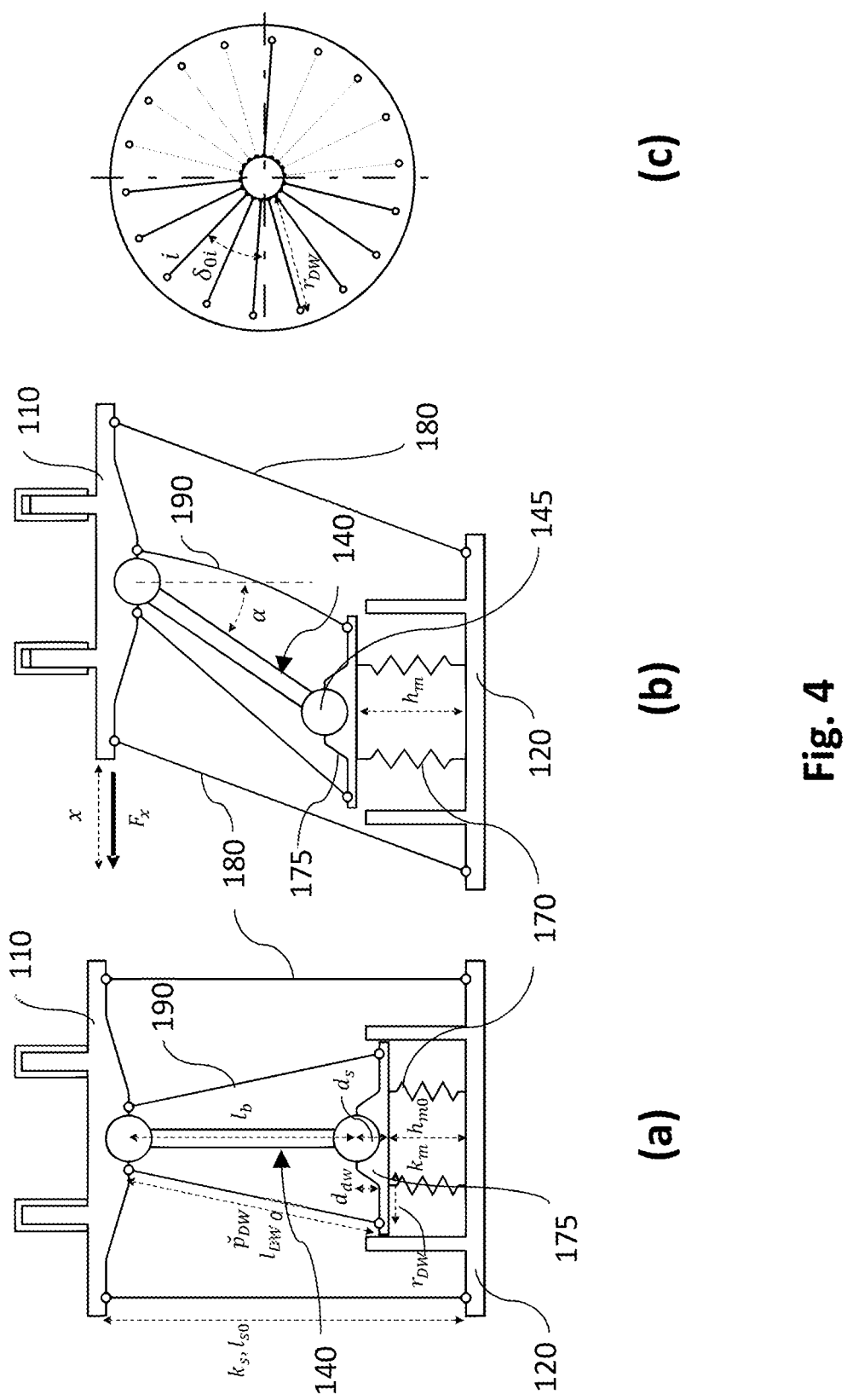
FIG. 4 shows: (a) diagrammatic section of an embodiment of the device of the invention at rest, (b) diagrammatic section of the device in (a) in deformed configuration and (c) viewed from above of the group of oblique wires (190); the measurements associated with the geometric parameters are indicated by heights (dashed lines with arrows)

The force exerted on the horizontal plane $F_{xDW}$ (top view plane (c) in FIG. 4, i.e., plane parallel to the bases 120 and 110, in which the direction x is defined) by the group of oblique wires 190 is given by the sum of the horizontal forces of the n oblique wires stretched ($n_{dw}$):

$$F_{xDW} = \sum_1^{n_{dw}} F_{xDWi}.$$

The contribution of each of the stretched oblique wires 190 is calculated with the formula:

$$a_p = -(k_m + k_s)^2;$$
$$b_p = -2(k_m + k_s)(l_b\cos(\alpha)(k_m + 2k_s) + d_s(k_m + 2k_s) - h_{m0}k_m);$$

-continued $$c_p = -2l_b\cos(\alpha)\big(d_s(6k_mk_s + k_m^2 + 6k_s^2) - h_{m0}k_m(2k_m + 3k_s)\big) -$$
$$k_m^2(l_b^2 - h_{m0}^2) - \frac{1}{2}l_b^2\cos(2\alpha)k_s(4k_m + 5k_s)4l_b^2k_mk_s - \frac{T}{2}l_b^2k_s^2 +$$
$$2d_sh_{m0}k_m(2k_m + 3k_s) - d_s^2(6k_mk_s + k_m^2 + 6k_s^2) + k_s^2l_{s0}^2;$$

$$d_p =$$
$$\frac{1}{2}\big(l_b^2 k_s(-l_b\cos(3\alpha)k_s - 2\cos(2\alpha)(2d_sk_m + 5d_sk_s - 2h_{m0}k_m)) - l_b\cos(\alpha)(4l_b^2$$
$$k_mk_s + k_s^2(7l_b^2 - 4l_{s0}^2) - 8d_sh_{m0}k_m(k_m + 3k_s) + 12d_s^2k_s(k_m + 2k_s) + 4h_{m0}^2k_m^2) -$$
$$2d_s(4l_b^2k_mk_s + k_s^2(7l_b^2 - 2l_{s0}^2) + 2h_{m0}^2k_m^2) + 4l_b^2h_{m0}k_m(k_m + 2k_s) +$$
$$4d_s^2h_{m0}k_m(k_m + 3k_s) - 4d_s^3k_s(k_m + 2k_s));$$

$$e_p =$$
$$\frac{1}{2}\big(l_b^2k_s(\cos(2\alpha)(-l_b^2k_s + 4d_sh_{m0}k_m - 5d_s^2k_s + k_sl_{s0}^2) - l_b\cos(3\alpha)d_sk_s) + l_b$$
$$\cos(\alpha)(d_sk_s^2(4l_{s0}^2 - 7l_b^2) + 4l_b^2h_{m0}k_mk_s + 12d_s^2h_{m0}k_mk_s - 4d_sh_{m0}^2k_m^2 - 8d_s^3k_s^2) +$$
$$d_s^3(k_s^2(2l_{s0}^2 - 7l_b^2) - 2h_{m0}^2k_m^2) + 8l_b^2d_sh_{m0}k_mk_s +$$
$$l_b^2(k_s^2(l_{s0}^2 - l_b^2) - 2h_{m0}^2k_m^2) + 4d_s^3h_{m0}k_mk_s - 2d_s^4k_s^2);$$

where:

$A_{dw}$ is the section area of an oblique wire;

r is the distance measured on the horizontal plane between the two ends of an oblique wire;

$d_{dw}$ is the vertical distance measured from the center of the lower spherical hinge 145 to the lower end of the oblique wire;

$\delta_{0i}$ is the angle described by the wire lying on the horizontal plane and the movement direction of the upper cap;

$\sigma_i(\epsilon_i, \dot{\epsilon}_i)$ indicates the constitutive bond of the material forming the group of oblique wires (steel for the C2 configuration and NiTiNOL for C3) or the analytical law which relate the tension $\sigma_i$ to the elongation $\epsilon_i$ of the i-th wire and the variation speed thereof $\dot{\epsilon}_i$.

The elongation $\epsilon_i$ of the i-th wire is expressed by:

$$\epsilon_i = \frac{\sqrt{(l_b\cos(\alpha) + d_{dw})^2 + (l_b\cos(\alpha) + r\cos(\delta_{0i}))^2 + (r\sin(\delta_{0i}))^2} - l_{DW0}}{l_{DW0}}$$

where $l_{DW0}$ denotes the length of the oblique wire at rest (i.e., in the undeformed configuration).

Figure 5:
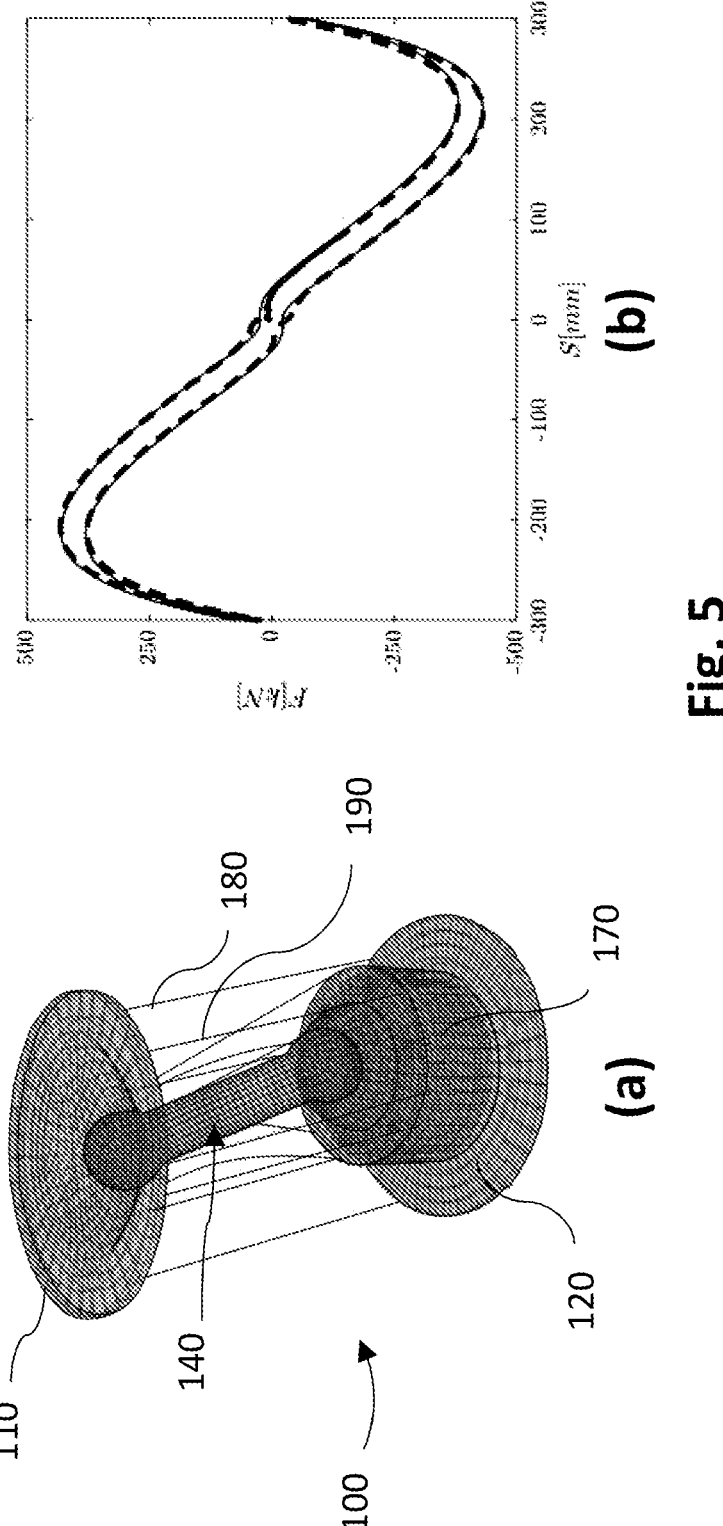
FIG. 5 shows: (a) a three-dimensional view of the numerical model of the damper of the previous figures implemented in the non-linear structural calculation code ABAQUS and (b) comparison between the analytical (grey) and numerical (black) force-movement cycles.

Such analytical equations were validated by comparison with the numerical response provided by an accurate non-linear three-dimensional model of the device implemented in the ABAQUS finite element code. FIG. 5 shows a three-dimensional view of the numerical model in the deformed configuration (a) and the force-movement response obtained by applying a cyclic movement history (U) in the horizontal plane (b). The comparison between analytical and numerical response confirms the accuracy of the equations obtained (FIG. 5 (*b*) shows two representative curves of the response provided by the analytical equations in a continuous line and the one obtained with the model in ABAQUS in a dashed line, respectively).

Given the complexity of the exact analytical formulation, the force-movement cycle provided by the latter was identified by a simpler analytical law in order to conduct a numerical investigation on the dynamic response of a mass to a degree of freedom representative of the structure and connected to the ground by means of a conventional isolation system parallel to the device, the results of which will be set out in the following paragraphs. The simplified force-movement law of the damper consists of two terms:

$$F_x = F_M + F_{DW}.$$

The first contribution ($F_M$) represents the negative stiffness force exhibited by the unstable mechanism and can be described by a negative linear stiffness term plus a positive cubic stiffness term:

$$F_M = -k_n x + k_3 x^3.$$

The second contribution ($F_{DW}$) represents the force provided by the group of oblique wires by means of a constitutive bond suitable for describing the hysteresis (e.g., the "Bouc-Wen" model [12-13]) or superelastic behavior (e.g., the "Charalampakis" model [14]) of the material forming the oblique wires.

Application in the Isolation of Vibrations and Shocks

The C3 configuration is optimal for the construction of a high-performance vibration isolation system. Vibration isolation is a mitigation strategy for mechanical vibrations which consists in the interposition of a deformable layer between the structure to be isolated and the source of vibrations which allows the relative movement, limiting the transmission of accelerations and thus of forces to the structure.

Figure 6:
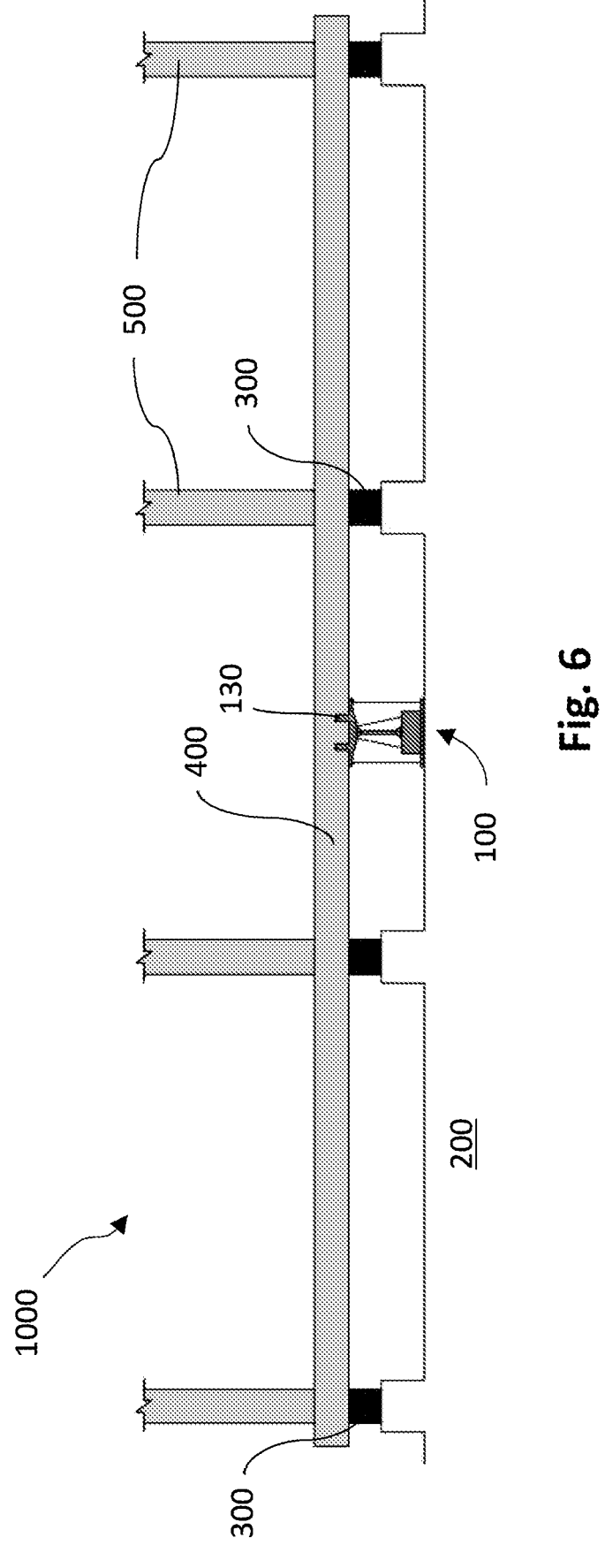
FIG. 6 shows a diagrammatic depiction of the application of the device according to the invention to conventional isolators in parallel.

Referring to the diagram in FIG. 6, by installing the damper 100 in parallel with the isolation devices 300 (for example elastomeric supports) between the foundations 200 and the first floor 400 (other planes are possible supported by the columns 500), it is possible to obtain an overall system 1000 in which there is simultaneously: (i) a stiffness such as to avoid displacements due to the action of the wind, (ii) a cut in the incoming forces, (iii) an end-stroke slowdown and a self-centering capacity. The use as a damper in a civil structure is purely indicative, since the rheological device can be used for any main structure which is to be protected from vibrations such as: biomedical equipment, nuclear, precision mechanics, large server racks, large industrial machinery (e.g., washing machines), towers, silos, collection tanks. To analyze the benefits the damper brings about to the isolation system, numerical analyses were carried out on the dynamic response of a simplified model to a degree of freedom under harmonic and impulsive forcing.

Figure 7:
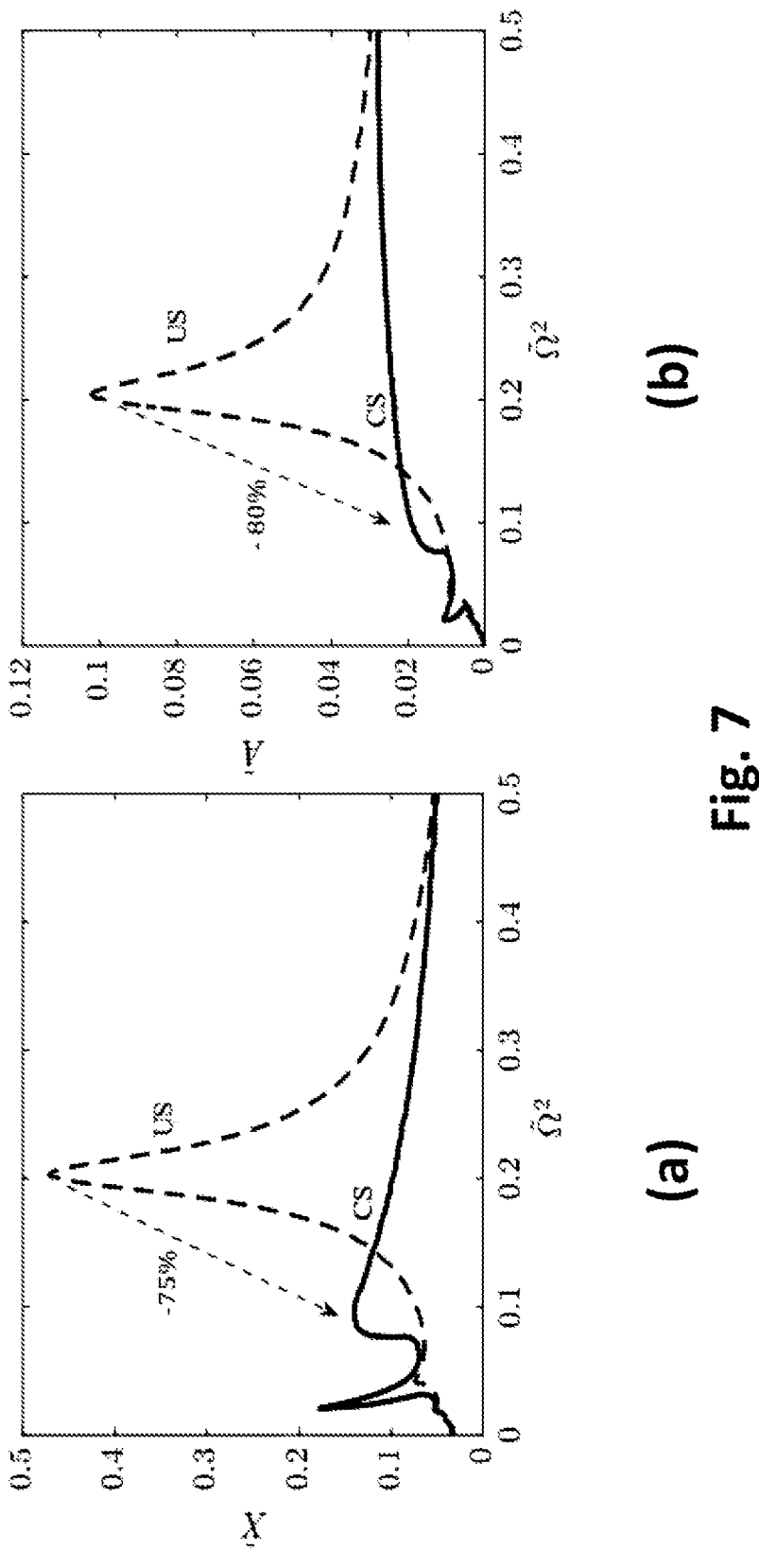
FIG. 7 shows frequency response curves in terms of displacements (a) and accelerations (b) for the uncontrolled structure (US) and for the structure with a device according to the invention (CS) in the C3 configuration.

FIG. 7 shows, by way of example, the frequency response curves of the uncontrolled (US) and controlled (CS) structure, i.e., the stationary response of the system under harmonic forcing as the frequency of the latter varies. It should be noted how the device-controlled system according to the invention exhibits, in resonance, a reduction in peak movement and acceleration of about 75% and 80%, respectively.

Figure 8:
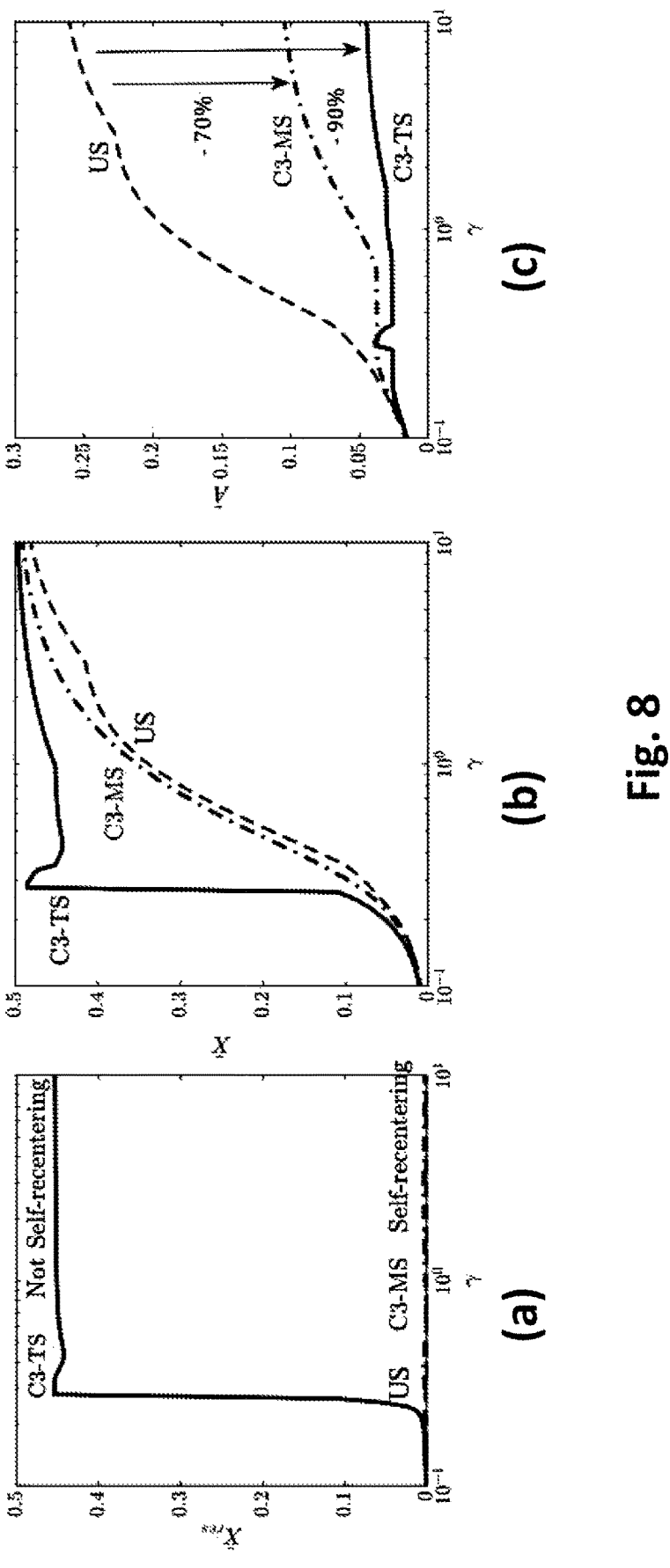
FIG. 8 shows the residual movement (a), maximum movement (b) and maximum acceleration (c) of the uncontrolled system (US) and system controlled by the device according to the invention in C3-mono-stable (C3-MS) and C3-tri-stable (C3-TS) configuration as the pulse speed (Y) varies.

Even under impulsive forcing, the damper according to the invention is able to produce a strong reduction of the maximum accelerations and, therefore, of the forces entering the system. FIG. 8 shows, by way of example, the maximum responses of the system in terms of movement ($\tilde{X}$) and acceleration ($\tilde{A}$) for an impulsive "step" type ground movement as the speed of the movement changes. In particular, the responses related to the uncontrolled structure (US), those related to the structure controlled by the damper in C3-monostable configuration (C3-MS), and finally the responses related to the system with C3-tri-stable (C3-TS) are described. It can be noted that the C3-monostable configuration produces a force reduction of about 70%, maximum displacements equal to those exhibited by the uncontrolled structure and at the same time re-concentration capacity, or zero residual displacements. The C3-tri-stable configuration, against the loss of recentering capacity, exhibits a further cut in accelerations (up to 90%).

Application to Vibration Absorption of Deformable Structures

Vibration absorption is a mechanical vibration mitigation strategy which is based on the use of a secondary oscillator connected to the structure to be protected. By adjusting the resonance frequency of the latter with that of the main structure, it is possible to obtain a reduction of vibrations by virtue of two main phenomena: the "counter-phase" oscillation of the secondary mass with respect to the main mass and the dissipation of energy produced by a possible damping organ within the secondary structure. Deformable structures, such as bridges, skyscrapers, towers, etc., show a constitutive behavior (force-movement) with strong non-linearity of predominantly geometric matrix, exhibiting a "softening" type response, or characterized by decreasing stiffness, or "hardening" type, or with increasing stiffness. The use of absorbers with linear constitutive behavior is not optimal for controlling the vibrations of a deformable structure since, given the non-linearity and thus the variability of the stiffness of the main structure, it is not possible to effectively tune the stiffness of the absorber and thus the frequency thereof. Conversely, the use of the device according to the invention in parallel with the secondary structure allows a wide modulation of the stiffness, allowing to obtain both a "softening" and "hardening" constitutive behavior of the absorber depending on the nature of the structure to be protected.

Figure 9:
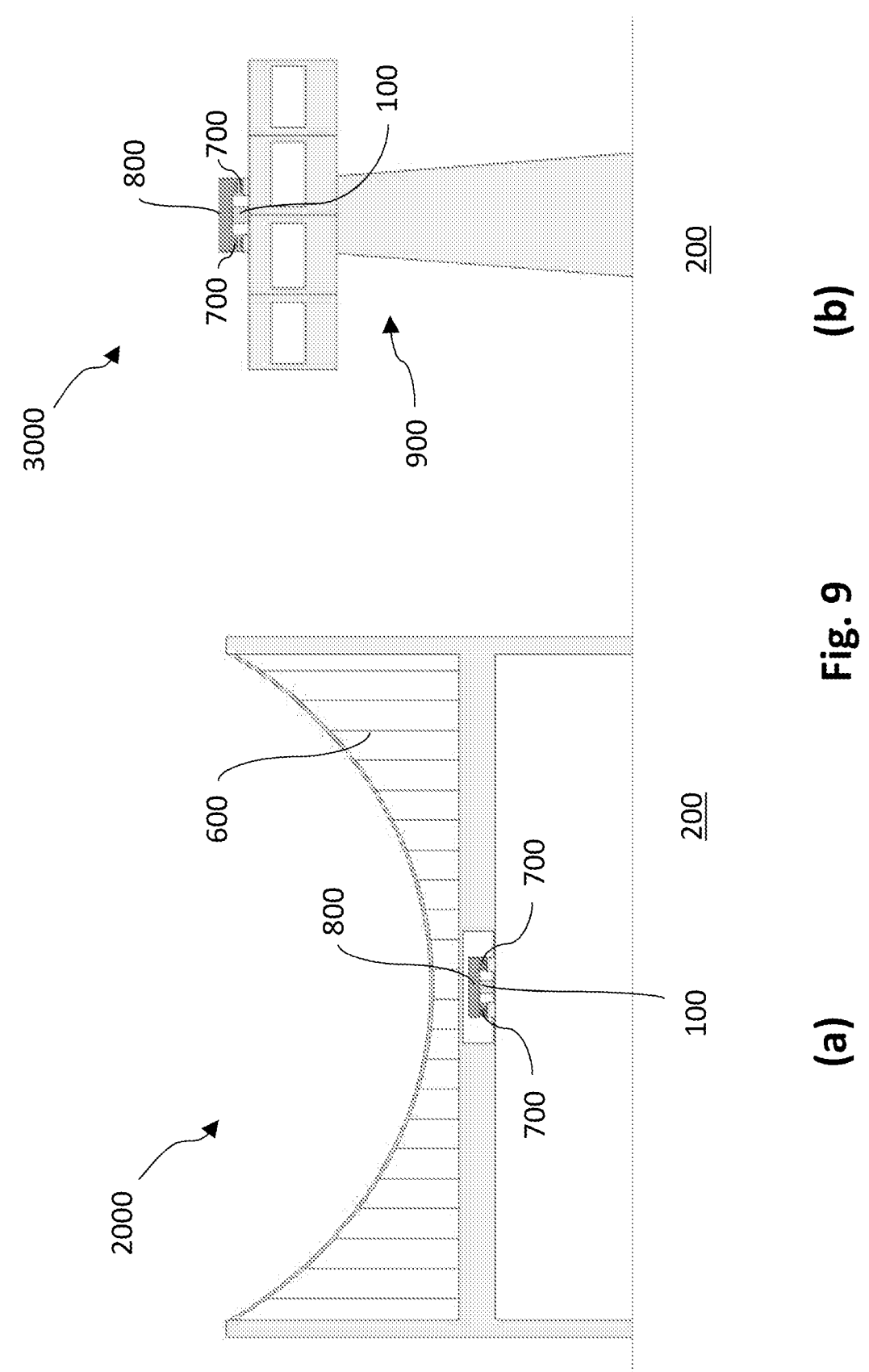
FIG. 9 shows an application example (not to scale for illustrative purposes) of the device as a vibration absorber for a deformable structure with a "hardening" (a) and "softening" (b) type response.

Referring to FIG. 9, an application example 2000 of the device according to the invention as a vibration absorber for a deformable structure 600 with a "hardening" type response (a) and 900 "softening" (b) is shown. In the case of hardening, the device 100 is placed, for example, inside a deck of a suspended structure 600, with the upper base 110 preferably connected to a secondary mass 800, which is resting on elastomeric supports 700, but is not in contact with the deformable structure 600.

The configuration 3000 is similar in the case of the mainly softening structure 900 (depending on the excited manner the response may be either softening or hardening), where the secondary mass 800 is connected by means of the devices 700 and 100 to the head of the structure 900.

Figure 10:
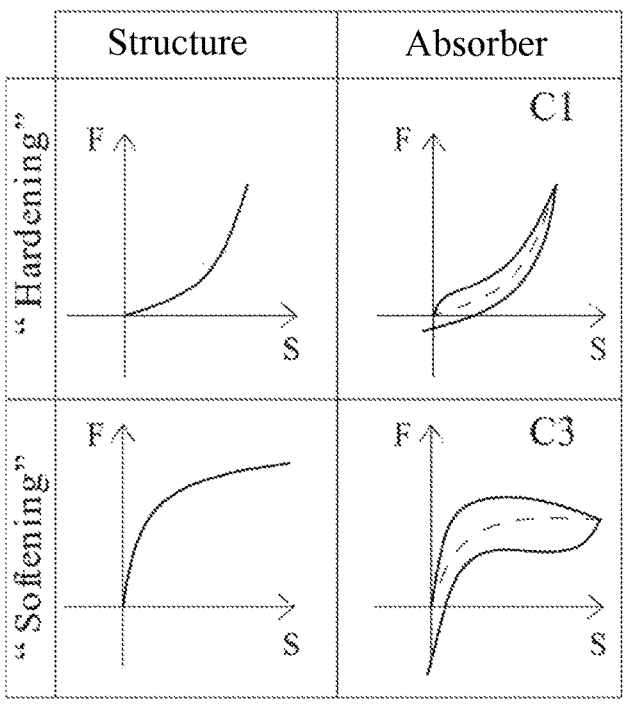
FIG. 10 shows the constitutive responses associated with the cases in FIG. 8.

FIG. 10 shows the constitutive responses associated with the cases in FIG. 9. In particular, the two graphs at the top show the constitutive response of the structure 600 and the set 700-800-100, while the ones at the bottom are associated with the response of the structure 900 and the set 700-800-100.

Figure 11:
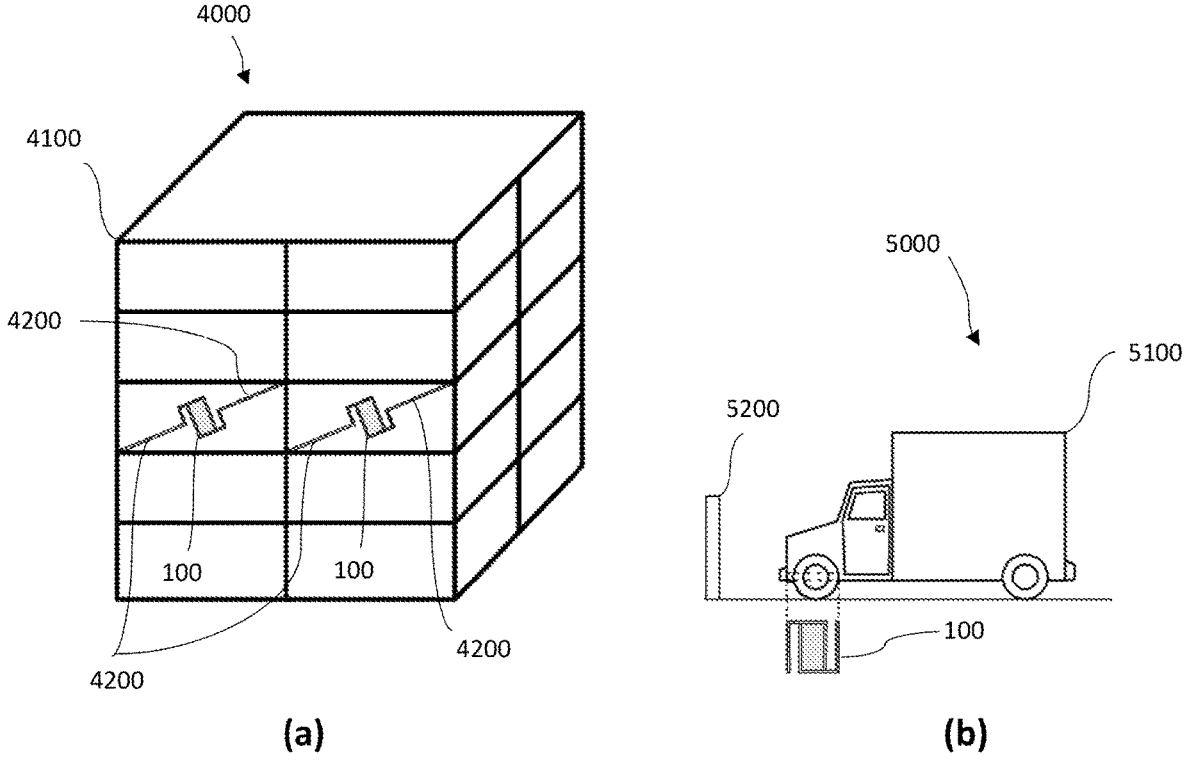
FIG. 11 shows application examples (not to scale for illustrative purposes) of the device as a dissipative bracing for a deformable structure in (a) and as a shock absorber for a motor vehicle in (b).

Referring to FIG. 11 (a), an example application 4000 of the device 100 according to the invention is shown as a dissipative bracing for a deformable structure 4100, in which one or more devices 100 are inserted between two elements 4200 inside the structure. FIG. 11 (b) instead shows an application example 5000 of the device 100 according to the invention as a shock absorber for a vehicle 5100 impacting against an obstacle 5200. In the latter case, the device 100 is conveniently positioned in front of the vehicle just behind the bumper, but can also be placed in the rear or side region.

11
12

Advantages of the Invention

The main advantages of the device according to the invention comprise:

a) DEVICE COMPACTNESS: the dampers with negative stiffness present in the literature are bi-stable mechanisms where the pre-compression is entrusted to pre-compressed deformable elements and inserted into the contrast frame. Such elements, subject to compression and thus to possible instability phenomena, are usually made by means of steel coil springs and take significant dimensions in proportion to the exerted control force. With the suggested device, on the other hand, it is possible to obtain high control forces simultaneously with small damper dimensions by virtue of the synergy of two factors:

the pre-compression is achieved through the pre-tensioning of the external ropes and the compressed elements, i.e., the rigid connecting rod and the polyurethane spring, are not susceptible to instability due to the morphology of the elements and the nature of the constraints applied.

The use of high-performance materials such as Fiber Reinforced Polymer (FRP) for the pre-tensioned ropes and polyurethane for the expansion spring allows obtaining high initial pre-tension levels.

The compactness of the damper is an aspect of fundamental importance in terms of design and ease of installation in existing and newly designed structures.

b) RESPONSE MULTI-DIRECTIONALITY: most of the dampers with negative stiffness in the literature are flat mechanisms able to exert the control force only in a direction. In most vibration control specific applications there can be any stress direction in the horizontal plane, for this reason an "isotropic" type damper response type is required.

c) RESPONSE VERSATILITY: By modulating the pull and number of external ropes, the relative dimensions between the connecting rod and the ropes, and the arrangement and material of the inclined ropes of the damping unit, different rheological behaviors can be obtained depending on the application scope of the damper.

The main applications of the device are listed below:
Vibration isolation devices;
Shock-absorbing devices;
Tuned mass damping devices:
Dissipative bracings of structures and infrastructures;
Non-linear mechanical actuators.

REFERENCES

[1] Platus, D. L. (1993). Vibration isolation system. U.S. Pat. No. 5,310,157A
[2] Avshalom Suissa (2013). Method and apparatus for suspension damping including negative stiffness. U.S. Pat. No. 9,370,982B2
[3] Zhou Peng (2017). The adjustable passive negative stiffness damper of series mechanism. China CN106836543A.
[4] Ma Yuhong (2020). Shape memory alloy negative stiffness damping device. China CN111119366A
[5] Michael Constantinou (2012). Negative stiffness device and method. United States U.S. Pat. No. 8,857,110B2
[6] Hanoi Sanxiu (2006). Negative rigid device and vibration isolation structure having the negative rigid device. China CN101351601B.
[7] Hirozaki Iemura (2013). Negative rigidity damper. Japan JP6304933B2.
[8] Cao Sa (2019). A kind of SMA negative stiffness damping device. China CN110397175A
[9] Salvatore, A., Carboni, B. and Lacarbonara, W. (2020) "Nonlinear dynamic response of an isolation system with negative stiffness and Shape Memory-based damping." ASME, IDETC-CIE 2020 Volume 2: 16th International Conference on Multibody Systems, Nonlinear Dynamics, and Control (MSNDC). DOI: 10.1115/DETC2020-22541
[10] Salvatore, A., Carboni, B. and Lacarbonara, W. (2021) "Nonlinear dynamic response of a Negative Stiffness-Shape Memory Alloy isolation system." Nonlinear Dynamics, DOI: 10.21203/rs.3.rs-186071/v1
[11] Salvatore, A. and Lacarbonara, W. (2021) "On the shock performance of a tri-stable isolator." NODYCON 2021 Virtual, Feb. 16-19, 2021, presentation only.
[12] Bouc R, Forced vibration of mechanical systems with hysteresis, Materials Science 1967.
[13] Wen Y, Method for random vibration of hysteretic Systems, Journal of the Engineering Mechanics Division (102), 249-263, 1976
[14] Charalampakis A E, Tsiatas G C, A Simple Rate-Independent Uniaxial Shape Memory Alloy (SMA) Model, Frontiers in Built Environment (4), 2018.
[15] Chinese Utility Model No. CN208685843U.
[16] Chinese Patent Application No. CN106545101A.

Preferred embodiments have been described above and some variants of the present invention have been suggested, but it is understood that those skilled in the art may make modifications and changes without departing from the corresponding scope of protection, as defined by the appended claims.

The invention claimed is:

1. A multidirectional hysteretic damper with negative stiffness, comprising:

a first base fixable to a first structure and facing a second base fixable to a second structure;

wherein said first and second bases extend parallel to a horizontal plane, the multidirectional hysteretic damper further comprising:

a connecting rod with an elongated body extended in a main extension direction, a first spherical head and a second spherical head being fixed at opposite ends of the elongated body;

a first housing connected to said first base, the first housing being configured to partially accommodate said first spherical head so that said connecting rod can rotate in every direction of said horizontal plane;

a second housing in or rigidly connected to said second base, the second housing being configured to partially accommodate said second spherical head so that said connecting rod can rotate in every direction of said horizontal plane;

a plurality of ropes connected between said first and second bases, arranged parallel about said connecting rod when the multidirectional hysteretic damper is at rest; and an elastic means with a first end and a second opposite end fixed to said first base, and to a movable wall in which said first housing is formed, respectively; and wherein the plurality of ropes is pre-tensioned so as to keep the connecting rod, when the multidirectional hysteretic damper is at rest, in a configuration perpendicular to said horizontal plane.

2. The multidirectional hysteretic damper of claim 1, wherein said plurality of ropes is arranged outside the connecting rod in an axial-symmetrical circumferential manner.

3. The multidirectional hysteretic damper of claim 1, further comprising a plurality of wires, connected between said movable wall and said second base or said first base, respectively, the wires of the plurality of wires being arranged circumferentially and in an axial-symmetrical manner with respect to said connecting rod.

4. The multidirectional hysteretic damper of claim 3, wherein the wires of said plurality of wires are arranged in a converging manner from the movable wall with respect to a direction perpendicular to said horizontal plane.

5. The multidirectional hysteretic damper of claim 3, wherein the plurality of wires is made of steel or shape memory alloy, or other fiber-reinforced metal alloys or polymer mixtures with a super elastic effect.

6. The multidirectional hysteretic damper of claim 5, wherein the shape memory alloy is NiTiNOL.

7. The multidirectional hysteretic damper of claim 1, wherein the plurality of ropes is made of fiber-reinforced polymers.

8. The multidirectional hysteretic damper of claim 1, wherein the second base is provided with fixing means to the second structure, and wherein the fixing means comprise vertical bars perpendicular to said horizontal plane.

9. The multidirectional hysteretic damper of claim 8, wherein said vertical bars are inserted into Teflon bushings or other types of linear bearings.

10. The multidirectional hysteretic damper of claim 1, wherein said elastic means is a spring.

11. The multidirectional hysteretic damper of claim 10, wherein said spring is a polyurethane spring.

12. A damped system, comprising a first structure, a second structure, and one or more multidirectional hysteretic dampers according to claim 1, wherein in each multidirectional hysteretic damper, the first base is fixed to the first structure which is a fixed reference and the second base is fixed to the second structure which is a structure to be damped.

13. The damped system of claim 12, wherein said one or more multidirectional hysteretic dampers are arranged parallel to one or more isolation devices interposed along said horizontal plane between the fixed reference and the structure to be damped.

14. A damped system, comprising a first structure and one or more multidirectional hysteretic dampers according to claim 1, wherein in each multidirectional hysteretic damper, the first base is fixed to the first structure and the second base is fixed to a mass, which is not connected to any structure.

15. A damped system, comprising a structure with one or more assemblies of internal structural elements, each assembly comprising at least two elements, as well as one or more corresponding multidirectional hysteretic dampers according to claim 1, wherein each of said one or more multidirectional hysteretic dampers is interposed between and connects each of said at least two elements.

16. A damped system, comprising one or more multidirectional hysteretic dampers according to claim 1, inserted inside a motor vehicle to absorb an impact of said motor vehicle against an obstacle.

* * * * *